(12) United States Patent
Gazzino (10) Patent No.: US 11,485,469 B2
(45) Date of Patent: Nov. 1, 2022

(54) AIRCRAFT OF A MODULAR TYPE, AND A METHOD OF PREPARING SUCH AN AIRCRAFT FOR A SPECIFIC MISSION

(71) Applicant: AIRBUS HELICOPTERS, Marignane (FR)

(72) Inventor: Marc Gazzino, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 262 days.

(21) Appl. No.: 16/688,373

(22) Filed: Nov. 19, 2019

(65) Prior Publication Data

US 2020/0172224 A1   Jun. 4, 2020

(30) Foreign Application Priority Data

Nov. 29, 2018   (FR) ........................................ 1872048

(51) Int. Cl.
*B64C 1/16*        (2006.01)
*B64C 27/12*       (2006.01)
(Continued)

(52) U.S. Cl.
CPC ................ *B64C 1/16* (2013.01); *B64C 27/12* (2013.01); *B64D 27/08* (2013.01); *B64D 27/24* (2013.01); *B64D 35/00* (2013.01); *B64D 35/02* (2013.01); *B64D 35/08* (2013.01); *B64D 41/00* (2013.01); *B64D 43/00* (2013.01); *B64D 2221/00* (2013.01)

(58) Field of Classification Search
CPC ........ B64D 27/24; B64D 35/02; B64D 35/08; B64D 41/00; B64D 41/007; B64D 2041/002
See application file for complete search history.

(56) References Cited

U.S. PATENT DOCUMENTS

2012/0025032 A1   2/2012   Hopdjanian et al.
2014/0145028 A1   5/2014   Gomez
(Continued)

FOREIGN PATENT DOCUMENTS

CA        2831706 A1 *  5/2014  ............ B64D 31/06
CN    101332872 A      12/2008
(Continued)

OTHER PUBLICATIONS

Singapore Search Report dated Jul. 24, 2020, Application No. 10201910876T, 3 Pages.
(Continued)

*Primary Examiner* — Timothy D Collins
*Assistant Examiner* — Justin Michael Heston
(74) *Attorney, Agent, or Firm* — Brooks Kushman P.C.

(57) ABSTRACT

An aircraft of a modular type including: at least one rotor suitable for providing in full or in part propulsion and/or lift for the aircraft; at least one power plant of the combustion engine type or of the electric motor type; a main gearbox, for mechanically transmitting drive torque generated by the at least one power plant to the at least one rotor; and an avionics system for assisting in piloting the aircraft. In accordance with the invention, the avionics system is configured for automatically providing the assistance in piloting the aircraft when the aircraft has a first power plant only or when the aircraft has a first power plant and a second power plant.

19 Claims, 4 Drawing Sheets

(51) Int. Cl.
*B64D 27/24* (2006.01)
*B64D 35/00* (2006.01)
*B64D 35/02* (2006.01)
*B64D 27/08* (2006.01)
*B64D 41/00* (2006.01)
*B64D 43/00* (2006.01)
*B64D 35/08* (2006.01)

(56) References Cited

U.S. PATENT DOCUMENTS

| | | | | |
|---|---|---|---|---|
| 2015/0028153 | A1* | 1/2015 | Rossotto | B64C 27/00 244/17.13 |
| 2016/0375994 | A1 | 12/2016 | Rossotto | |
| 2017/0073066 | A1* | 3/2017 | De Meerschman | B64C 27/12 |
| 2017/0320585 | A1* | 11/2017 | Armstrong | B64D 31/00 |
| 2018/0170509 | A1 | 6/2018 | Mores et al. | |
| 2018/0319283 | A1* | 11/2018 | Battin | B64D 27/24 |

FOREIGN PATENT DOCUMENTS

| | | | |
|---|---|---|---|
| EP | 0 272 822 B1 | 3/1991 | |
| EP | 2735512 A1 | 5/2014 | |
| EP | 3095695 A1 | 11/2016 | |
| FR | 2962404 A1 | 1/2012 | |
| FR | 3036235 A1 * | 11/2016 | B64C 27/12 |
| FR | 3040977 A1 | 3/2017 | |
| GB | 584779 A | 1/1947 | |
| RU | 2243925 C2 * | 1/2005 | |
| WO | 9606749 A1 | 3/1996 | |

OTHER PUBLICATIONS

Singapore Written Opinion dated Jul. 24, 2020, Application No. 10201910876T, 7 Pages.
French Search Report for French Application No. FR 1872048, Completed by the French Patent Office, dated Jul. 29, 2019, 10 pages.
Singapore Written Opinion dated Sep. 2, 2021, Application No. 10201910876T, 5 Pages.

* cited by examiner

AIRCRAFT OF A MODULAR TYPE, AND A METHOD OF PREPARING SUCH AN AIRCRAFT FOR A SPECIFIC MISSION

CROSS-REFERENCE TO RELATED APPLICATIONS

This application claims priority to French patent application No. FR 18 72048 filed on Nov. 29, 2018, the disclosure of which is incorporated in its entirety by reference herein.

BACKGROUND OF THE INVENTION

(1) Field of the Invention

The present invention relates to the field of aviation, and more particularly to aircraft having at least one rotor designed to participate in providing at least lift, or indeed also propulsion of the aircraft in the air.

In general, such aircraft are designed with a specific power plant that cannot be modified or replaced subsequently with a power plant of a different type to suit the needs of the user. Each aircraft is designed to receive a power plant that can, for example, be of the combustion engine type and/or of the electric motor type.

(2) Description of Related Art

Document EP 3 095 695 discloses a hybrid power plant of a multi-engined aircraft, that power plant being equipped with at least two fuel-burning engines. An electric motor also serves to drive a rotor of the multi-engined aircraft. That electric motor is suitable for delivering additional power when it is activated. Each engine and the motor are mechanically connected to a main gearbox. A regulator device serves to control the engines and the motor. The electric motor does not operate in motor mode during an initial operating step, so that a rotary member does not then drive the rotor. That electric motor can then take energy from the gearbox by operating in an alternator mode.

Document EP 2 735 512 discloses an aircraft having a rotary wing and at least one main gearbox for driving rotation of said rotary wing. That aircraft has a first main engine and a second main engine for driving the main gearbox. On that aircraft, a main regulation system is provided that regulates the first main engine and the second main engine in application of a setpoint that is variable. In addition, that aircraft has a secondary engine for driving the main gearbox, and a secondary regulation system that regulates the secondary engine in application of a setpoint that is constant, so that its regulation is independent from the regulation performed by the main regulation system.

Documents FR 3 040 977, US 2018/0170509, and WO 96/06749 are also known.

By way of example, Document FR 2 962 404 thus discloses a hybrid aircraft having a first power plant of the combustion engine type and a second power plant of the electric motor type. In addition, such a hybrid aircraft also has a single, common main gearbox that is connected both to the first power plant and to the second power plant.

However, such aircraft are then certified with those specific power plants that must be kept throughout the lives of the aircraft.

Therefore, if the needs of the user change, or if the missions of the aircraft are of very varied natures, the power plant initially chosen when the aircraft was purchased can become inappropriate. Such an initial choice of power plant is therefore sometimes very complex to make, and generally results from compromise.

Furthermore, such a compromise in choosing the power plant can lead to subsequent operating costs that are very high when, using the aircraft. In some situations, the user of an aircraft can then be constrained not to use the aircraft for all of the missions for which the user initially planned to use it.

BRIEF SUMMARY OF THE INVENTION

An object of the present invention is thus to propose an aircraft of a novel type that enables the abovementioned limitations to be overcome. Such an aircraft then has an architecture that is modular both mechanically so that drive torque can be transmitted to at least one rotor, and also electrically so that power plants of different types, and more precisely power plants of the combustion engine type and of the electric motor type, can be caused to operate in alternation or simultaneously.

As mentioned above, the invention therefore provides an aircraft of a modular type including:

at least one rotor suitable for providing in full or in part propulsion and/or lift for said aircraft;

at least one power plant of the combustion engine type or of the electric motor type;

a main gearbox, for mechanically transmitting drive torque generated by the power plant(s) to the rotor(s); and an avionics system for assisting in piloting the aircraft.

In accordance with the invention, the aircraft is remarkable in that it further includes:

at least two electrical connection interfaces that are continuously electrically connected to said avionics system, a first electrical connection interface electrically connecting the avionics system to a first power plant of the power plant(s) and a second electrical connection interface being left free or electrically connecting the avionics system to a second power plant of the power plant(s); and at least two mechanical connection interfaces continuously mechanically connected to the main gearbox, a first mechanical connection interface mechanically connecting the main gearbox to the first power plant and a second mechanical connection interface being left free or mechanically connecting the main gearbox to the second power plant; and wherein said avionics system is configured for automatically providing the assistance in piloting the aircraft firstly when only the first power plant is electrically connected to the first electrical connection interface and secondly when both the first power plant is electrically connected to the first electrical connection interface and the second power plant is electrically connected to the second electrical connection interface.

In other words, the electrical connection interfaces are not necessarily all connected to respective power plants. Thus, at least the first electrical connection interface then electrically connected to the first power plant. In addition, these electrical connection interfaces may, for example, be in the form of one or more male and/or female electrical connectors or indeed in the form of one or more electrical connection bays.

Similarly, the mechanical connection interfaces are not necessarily all connected to respective power plants. Thus, at least one of said mechanical connection interfaces is then mechanically connected to a power plant, regardless of the type of said power plant. In addition, these mechanical connection interfaces may have shafts, gear cogs, wheels or any parts suitable for being driven mechanically in rotation by a power plant.

Such mechanical connection interfaces may also be arranged inside or extend outside a casing of the main gearbox.

When the mechanical connection interfaces are arranged inside the casing of the main gearbox, said casing then has orifices suitable for allowing an outlet shaft of at least one power plant to pass through them. The orifices may also be closed off by removable caps or plugs that are put in place on the casing of the main gearbox, or removed from the casing of the main gearbox depending on the number of power plants connected to the mechanical connection interfaces.

Furthermore, the second mechanical connection interface may be arranged at a power takeoff point on the main gearbox when the second power plant is absent or does not supply power to the main gearbox.

Such a power takeoff point on the main gearbox may, in particular, make it possible to generate hydraulic energy or to generate electrical energy.

Furthermore, the avionics system equipping the aircraft enables the control and the assistance in piloting of the aircraft to be adapted automatically as a function of the number and of the types of the power plants connected to the two electrical interfaces. For example, such an avionics system may then include at least one computer suitable for determining the number of power plants and for identifying the type(s), combustion engine or electric motor, of the power plant(s) electrically connected to the avionics system. For example, a "pin programming" system may be used so that the computer can automatically configure itself as a function of the power plants used.

Advantageously, the first power plant may be arranged in such a manner as to be retractable relative to a structure of the aircraft and be configured to be replaced with another power plant of the combustion engine type or of the electric motor type that is distinct from the first power plant.

Such an arrangement whereby the first power plant is retractable relative to the structure of the aircraft participates in the modular aspect of the aircraft. In addition such a retractable arrangement enables the first power plant to be interchangeable by making it easy and quick to replace with another power plant that is more suited to a new mission to be flown by the aircraft, and that then represents a new first power plant for the aircraft.

Furthermore, the arrangement whereby the first power plant is retractable relative to the structure may, for example, be achieved by using quick securing means such as guide rails, position indexing or keying means, snap-fastening means, or indeed pins suitable for facilitating the operations for reversible assembly between the first power plant and the structure of the aircraft.

Such another power plant becomes the new first power plant and may then be of the same type, combustion engine type or electric motor type, but of power different from the power of the preceding first power plant. Alternatively, the other power plant may be of a type other than the type of the preceding first power plant.

Similarly, the second power plant may be arranged in such a manner as to be retractable relative to a structure of the aircraft and be configured to be replaced with another power plant of the combustion engine type or of the electric motor type that is distinct from the second power plant.

Similarly to the retractable arrangement of the first power plant, such an arrangement whereby the second power plant is retractable relative to the structure of the aircraft also makes it easy and quick to replace said second power plant if it is not suited to a new mission to be flown by the aircraft.

Thus, the arrangement whereby the second power plant is retractable relative to the structure may, for example, be achieved by using quick securing means such as guide rails, position indexing or keying means, snap-fastening means, or indeed pins suitable for facilitating the operations for reversible assembly between the second power plant and the structure of the aircraft.

Said second power plant can then be removed quickly and not be replaced if it is not of any use to the coming mission, or indeed be replaced with another power plant that becomes the new second power plant for the purposes, for example, of increasing the range of the aircraft, of reducing its noise footprint, and/or indeed of increasing the safety level relating to the mission of the aircraft.

Such another power plant may then be of the same type, combustion engine type or electric motor type, but of power different from the power of the preceding second power plant. Alternatively, this other power plant may be of a type other than the type of the preceding second power plant.

In practice, the first power plant may include a first group of at least two engines of the combustion type or a first group of at least two motors of the electric type.

In other words, the first power plant may include a plurality of engines or motors arranged, for example, mechanically in parallel and making it possible to participate simultaneously in driving the rotor(s) of the aircraft in rotation. In the event that one of the engines or motors of the first power plant fails, another engine or motor of the first power plant can then enable the pilot of the aircraft to continue flying the mission and/or to land the aircraft safely.

In an advantageous example of the invention, the aircraft may include a first accessory gearbox, the first accessory gearbox comprising at least two inlet shafts mechanically connected to respective ones of the outlets shafts of the motors or engines of the first group, the first accessory gearbox comprising an outlet shaft mechanically connected to the first mechanical connection interface.

In other words, such a first accessory gearbox may make it possible to adapt the speed of the outlet shafts of the motors or engines of the first group so that the inlet shaft of the main gearbox is driven at a speed of rotation lying in a predetermined range of speeds.

For example, the first accessory gearbox may comprise a speed reducer for adapting and reducing a speed of rotation of the outlet shafts of the motors of the electric type of the first group.

The outlet shafts of the motors of the electric type of the first power plant can be driven in rotation at a speed of rotation that is much higher than the speed of rotation of the outlet shafts of the engines of the combustion type. It may therefore be advantageous to reduce said speed of rotation of the outlet shafts of the motors of the electric type before the coupling to the first mechanical connection interface.

Similarly, the second power plant may include a second group of at least two engines of the combustion type or a second group of at least two motors of the electric type.

Thus, the second power plant may include a plurality of engines or motors arranged, for example, mechanically in parallel in such a manner as to be able to participate simultaneously in driving the rotor(s) of the aircraft in rotation. In the event that one of the engines or motors of the second power plant fails, another engine or motor of the second power plant can then enable the pilot of the aircraft to continue flying the mission and/or to land the aircraft safely.

In an advantageous example of the invention, the aircraft may include a second accessory gearbox, the second accessory gearbox comprising at least two inlet shafts mechanically connected to respective ones of the outlets shafts of the motors or engines of the second group, the second accessory gearbox comprising an outlet shaft mechanically connected to the second mechanical connection interface.

In other words, such a second accessory gearbox can make it possible to adapt the outlet speed of the outlet shafts of the motors or engines of the second group so that the inlet shaft of the main gearbox is driven at a speed of rotation lying in a predetermined range of speeds.

For example, the second accessory gearbox may comprise a speed reducer for adapting and reducing a speed of rotation of the outlet shafts of the motors of the electric type of the second group.

As above, the outlet shafts of the motors of the electric type of the second power plant can be driven in rotation at a speed of rotation that is much higher than the speed of rotation of the outlet shafts of the engines of the combustion type. It may the be advantageous to reduce said speed of rotation of the outlet shafts of the motors of the electric type before the coupling to the second mechanical connection interface.

Advantageously, the aircraft say include a first storage compartment making it possible to store a fuel energy first energy source, the first storage compartment being hydraulically connected to the power plant(s) for the purpose of feeding the power plant (s) with the fuel energy first energy source, the first storage compartment being fully or partially retractable relative to a structure of the aircraft and configured to be replaced with a second storage compartment for storing an electrical energy second energy source distinct from the fuel energy first energy source.

Thus, such a retractable arrangement whereby the first storage compartment is retractable relative to structure of the aircraft also participates in the modular aspect of the aircraft. Furthermore, this retractable arrangement makes it possible to make the first storage compartment easily interchangeable by making it easy and quick to replace with a second storage compartment for storing an electrical energy second energy source that is better suited to a new mission to be flown by the aircraft.

In analogous manner, the aircraft may include a first storage compartment making it possible to store an electrical energy first energy source, the first storage compartment being electrically connected the power plants for the purpose of powering the power plants with the electrical energy first energy source, the first storage compartment being fully or partially retractable relative to a structure of the aircraft and configured to be replaced with a second storage compartment for storing a fuel energy second energy source distinct from the electrical energy first energy source.

As above for the power plants, the arrangement whereby the first storage compartment is retractable relative to the structure may, for example, include quick securing means such as guide rails, position indexing or keying means, snap-fastening means, or indeed pins suitable for facilitating the operations of reversible assembly between the first storage compartment and the structure of the aircraft.

The present invention also provides a method of preparing an aircraft of a modular type as described above for a specific mission.

In accordance with the invention such a method is remarkable in that it comprises firstly at least one preliminary step chosen from among the group comprising the following preliminary steps:
   determining the needs in terms of range of the aircraft for flying the mission;
   determining the needs in terms of performance of the aircraft for flying the mission;
   determining the constraints related to a safety level for the mission; and
determining the constraints related to a maximum noise level allowable for the mission; and
   secondly the following steps:
   generating a list of at least two power plants of the combustion engine type and/or of the electric motor type, said list being conditioned by the preliminary step(s), and being adapted specifically to the mission of the aircraft;
   selecting the power plant(s) of the combustion engine type or of the electric motor type from among the list of at least two power plants of the combustion engine type and/or of the electric motor type;
   fitting the power plant (s) to the structure of the aircraft;
   electrically connecting the power plants to the avionics system for assisting in piloting the aircraft; and
   mechanically connecting the power plant (s) to the main gearbox.

In other words, the method of preparing an aircraft of a modular type includes at least one preliminary step to determine at least one need or at least one constraint for a mission of the aircraft. Furthermore, needs in terms of performance may, for example, relate to the maximum altitude to be reached by the aircraft during the mission, or indeed the maximum weight of the aircraft on takeoff.

The step of generating a list of at least two power plants is performed on the basis of the preliminary determination steps. It makes it possible to weight and to give more or less significance to the various needs and to the various constraints of the mission. The step of generating a list of at least two power plants then makes it possible to give one or more power plant solutions that are more or less well suited to the mission.

For example, a computer may apply one or more laws or relationships for studying a wider list of several power plants and then narrow it down in order to generate the shorter list of at least two power plants making it possible to achieve the objectives set on the basis of the needs and constraints related to the mission.

The choice can then correspond to selecting one or more power plants from among the list of proposals generated during the preceding generation step. The power plant(s) chosen may then correspond to a first power plant of the combustion engine type used on its own, to a first power plant of the combustion engine type combined with a second power plant of the combustion engine type, to a first power plant of the combustion engine type combined with a second power plant of the electric motor type, to a first power plant of the electric motor type used on its own, or indeed to a first power plant of the electric motor type combined with a second power plant of the electric motor type.

Furthermore, the selection may also be made from among one (or more) power plant(s) of the same type, of the combustion engine type or of the electric motor type, but having, for example, specific power levels and/or weights that are distinct from each other.

In this way, an operator can have at least one modular aircraft and optionally a fleet of modular aircraft, each aircraft having one or more power plants that can be common and interchangeable. For each mission of one of the aircraft in the fleet, the operator can then implement the preparation method and then select, in a storage facility, the power plant(s) that is/are the best suited to the mission being prepared.

Once the selection step has been performed, the user or an operator then fits the power plant(s) to the structure of the aircraft. Such fitting is then performed using reversible securing means that are suitable for being easy and quick to put in place and or to remove.

Finally, the user or the operator makes the electrical and mechanical connections for connecting the power plant(s) firstly to the avionics system and secondly to the main gearbox.

The aircraft is then ready to fly a mission with the power plant(s) specifically adapted to suit the needs and constraints of the mission.

Advantageously, the method may further comprise a securing step for securing to the structure of the aircraft a storage compartment for storing a fuel or electrical energy source adapted to the power plant(s), and a hydraulic or electrical connection step for connecting the storage compartment to the power plant(s).

Depending on the selection made in the selection step for selecting the power plant (s), it may also be useful or necessary to secure a storage compartment for storing a fuel/electrical energy source. In the same way as for the power plant(s), such securing of the storage compartment is then performed using reversible securing means suitable for being easy and quick to put in place.

Furthermore, once such a storage compartment for storing a fuel/electrical energy source has been put in place and secured to the structure of the aircraft, said storage compartment is also connected hydraulically and/or electrically to the power plant(s) and optionally to the avionics system of the aircraft. Said storage compartment may, for example, contain a fuel tank, or alternatively an electrical energy storage battery.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures may be given the same references in each of them.

As indicated above, the invention thus relates to an aircraft 1 of a modular type that is adaptable to suit a mission to be flown.

Figure 1:
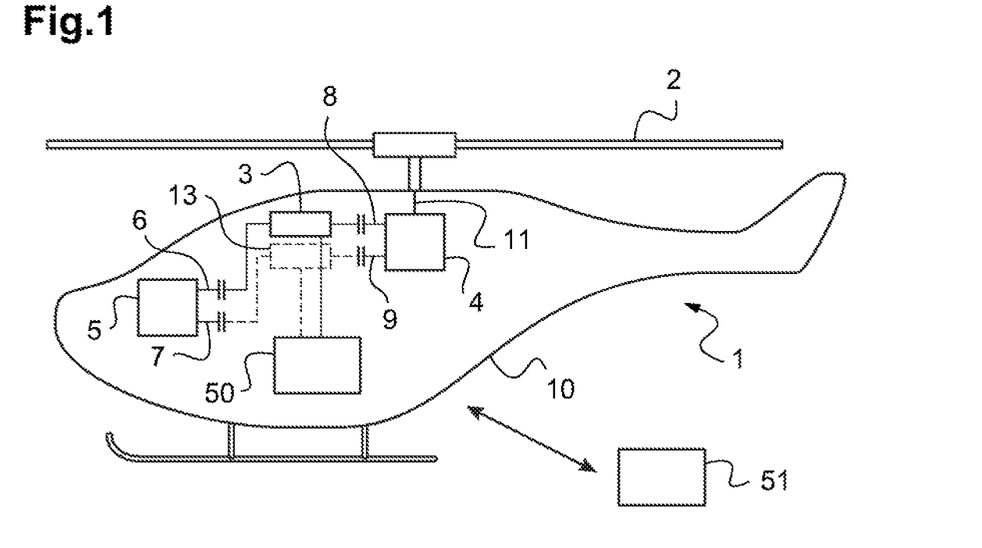
FIG. 1 is a diagrammatic side view of an aircraft of the invention.

As shown in FIG. 1, such an aircraft 1 then has at least one rotor 2 suitable for providing, in full or in part, propulsion and/or lift for an aircraft 1 in the air. The aircraft also has at least one first power plant 3 and optionally a second power plant 13, each power plant being of the combustion engine type or of the electric motor type, and a main gearbox 4 for mechanically transmitting drive torque generated by the power plant(s) 3, 13 to the rotor (s) 2.

Thus, such a main gearbox 4 has at least one outlet shaft 11 suitable for driving the rotor(s) 2 in rotation. Conversely, by way of inlets, the main gearbox 4 has at least two mechanical connection interfaces 8 and 9 making it possible to connect the main gearbox 4 mechanically to each of the power plants 3, 13.

Furthermore, before flying, a first mechanical connection interface 8 is then necessarily connected to the first power plant 3. Conversely, a second mechanical connection interface 9 may either be left free or else be connected to the second power plant 13.

The aircraft 1 also has an avionics system 5 for assisting in piloting the aircraft 1. Such an avionics system 5 is then electrically connected to the power plant(s) by means of at least two electrical connection interfaces 6 and 7. Thus, a first electrical connection interface 6 is connected to the first power plant 3, which may be of the combustion engine type or of the electric motor type, and a second electrical connection interface 7 may be left free or alternatively be connected to the second power plant 13 of the combustion engine type or of the electric motor type.

Furthermore, the avionics system 5 may be configured to adapt the assistance in piloting the aircraft 1 automatically as a function of the number, of the power level(s), and of the type(s) of the power plant(s) 3, 13 connected to the electrical connection interfaces 6 and 7.

The aircraft 1 may also have a first storage compartment 50 for storing a first fuel/electrical energy source that is then connected hydraulically/electrically to the power plant(s) 3, 13. Such a storage compartment 50 then makes it possible to feed or power the power plant(s) 3, 13 with the first fuel/electrical energy source. However, this first storage compartment 50 may be fully or partially retractable relative to a structure 10 of the aircraft 1.

Thus, such a first storage compartment 50 may be configured to be quick and simple to replace with a second storage compartment 51 for storing a second fuel/electrical energy source distinct from the first fuel/electrical energy source.

Similarly, the first power plant 3 and/or the second power plant 13 may be arranged to be retractable relative to the structure 10 of the aircraft 1.

Thus, the first power plant 3 and/or the second power plant 13 may be configured to be replaced quickly and easily with another power plant of the combustion engine type or of the electric motor type that is distinct from the first power plant 3 and/or from the second power plant 13, or indeed, as regards the second power plant 13, it may be configured to be merely removed quickly and easily.

Figure 2:
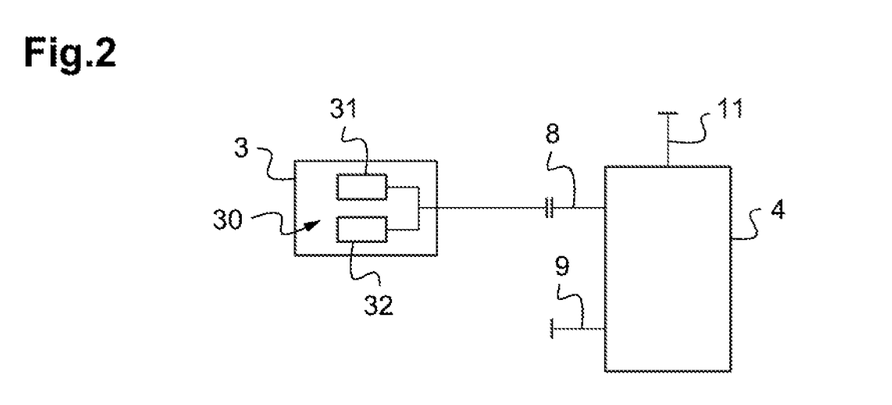
FIGS. 2 to 6 are diagrams showing variant power plant configurations for an aircraft of the invention.
Figure 3:
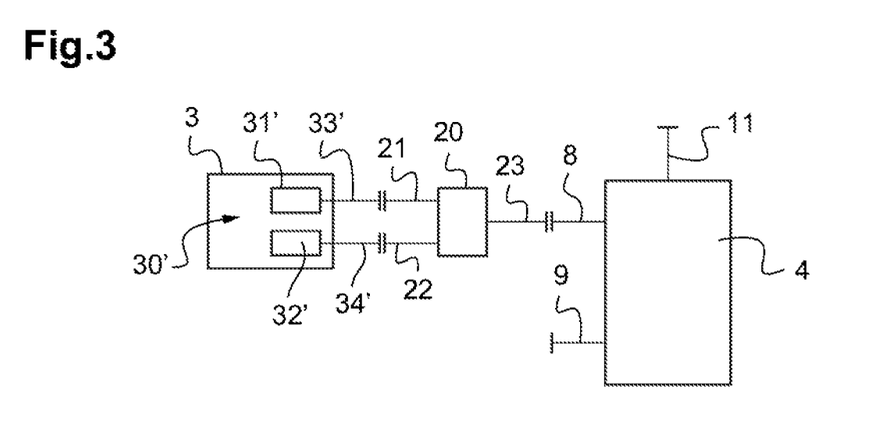

As shown in FIGS. 2 and 3, the aircraft 1 may then have a single power plant 3 that is mechanically connected to the first mechanical connection interface 8. The second mechanical connection interface 9 is left free.

In addition, in a first variant power plant configuration for the aircraft 1, and as shown in FIG. 2, the first power plant 3 may have a first group 30 of at least two engines 31 and 32 of the combustion type and no second power plant.

In a second variant power plant configuration for the aircraft 1, and as shown in FIG. 3, the first power plant 3 may have a first group 30' of at least two motors 31' and 32' of the electric type. Furthermore, in order to make it possible to reduce the speed of rotation of the outlet shafts 33' and 34' of the first power plant 3, the aircraft 1, or indeed the first power plant 3, may then also have a first accessory gearbox 20 provided with two inlet shafts 21 and 22. These inlet shafts 21 and 22 are connected mechanically to respective ones of the outlet shafts 33' and 34' of the two motors 31' and 32' of the electric type.

In addition, the first accessory gearbox 20 also has an outlet shaft 23 mechanically connected to the first mechanical connection interface 8.

Furthermore, the first power plant 3 and the first accessory gearbox 20 may advantageously form a one-piece assembly that is interchangeable with another power plant, e.g. of the combustion engine type, which then becomes the new first power plant of the aircraft 1.

Figure 4:
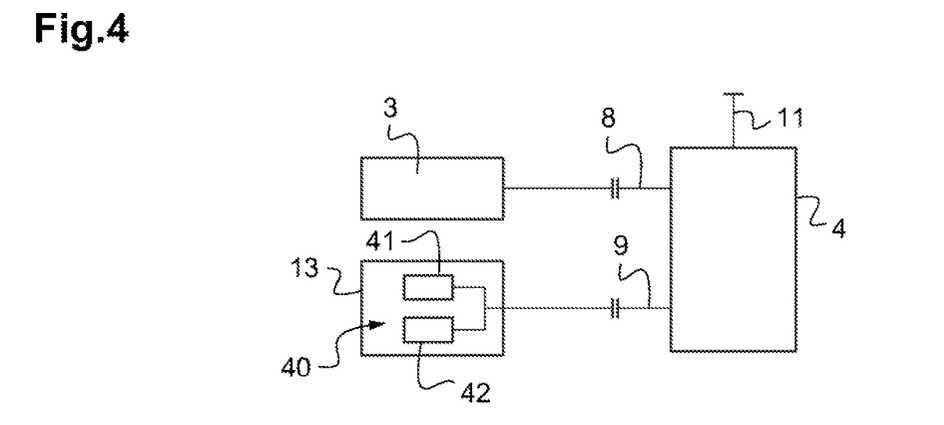
Figure 5:
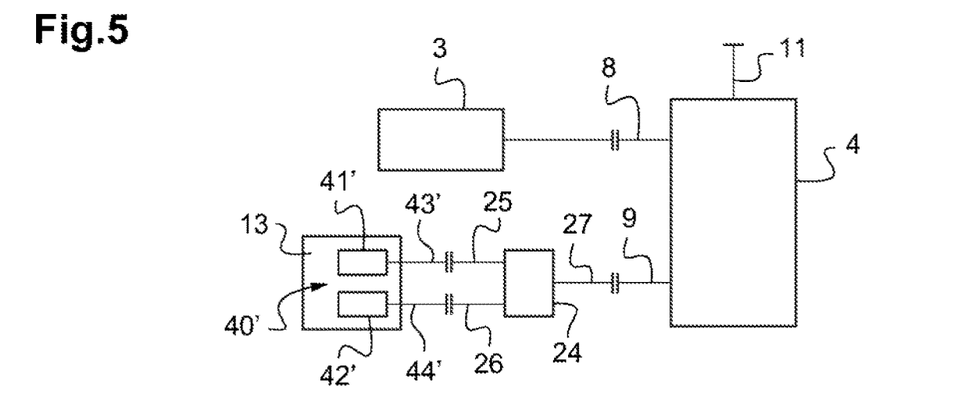
Figure 6:
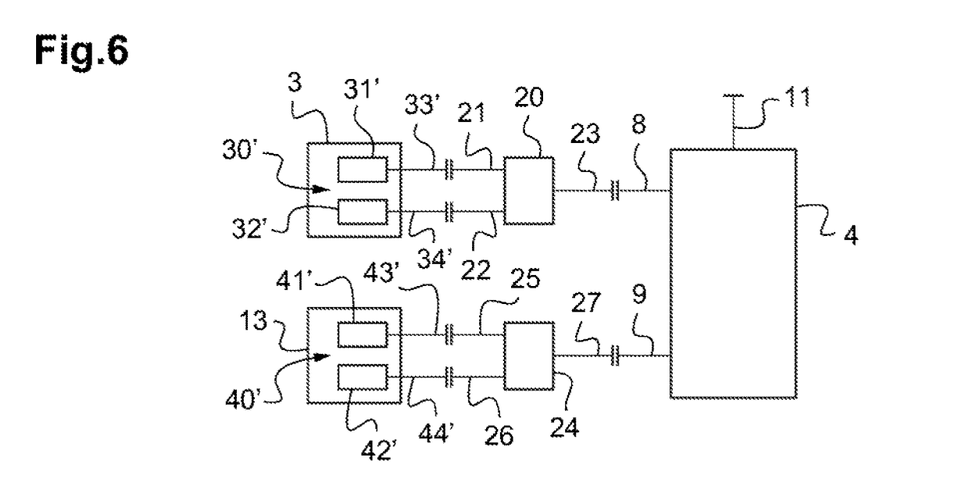

As shown in FIGS. 4 to 6, the aircraft 1 may also have a first power plant 3 that is mechanically connected to the first mechanical connection interface 8, and a second power plant 13 that is mechanically connected to the second mechanical connection interface 9. Naturally, as mentioned above, such first and, second power plants 3, 13 are also electrically connected to the avionics system 5.

In addition, and as shown in FIGS. 4 and 5, the first power plant 3 may have a single engine of the combustion type.

Furthermore, in a third variant power plant configuration for the aircraft 1, and as shown in FIG. 4, the second power plant 13 may have a second group 40 of at least two engines 41 and 42 of the combustion type.

In a fourth variant power plant configuration for the aircraft 1, and as shown in FIG. 5, the second power plant 13 may also have a second group 40' of at least two motors 41' and 42' of the electric type. In, which case, in order to make it possible to reduce the speed of rotation of the outlet shafts 43' and 44' of the second power plant 13, the aircraft 1 may then also have a second accessory gearbox 24 provided with two inlet shafts 21 and 22. These inlet shafts 21 and 22 are connected mechanically to respective ones of the outlet shafts 43' and 44' of the two motors 41' and 42' of the electric type.

As above, the second accessory gearbox 24 also has an outlet shaft 27 that is then mechanically connected to the second mechanical connection interface 9.

In a fifth variant power plant configuration for the aircraft 1, and as shown in FIG. 6, the first power plant 3 may have a first group 30' of at least two motors 31' and 32' of the electric type, and the second power plant 13 may also have a second group 40' of at least two motors 41' and 42' of the electric type.

In which case, in order to make it possible to reduce the speed of rotation of the outlet shafts of the first power plant 3, the aircraft 1 may then also have a first accessory gearbox 20 provided with two inlet shafts 21 and 22. These inlet shafts 21 and 22 are connected mechanically to respective ones of the two outlet shafts 33' and 34' of the two motors 31' and 32' of the electric type of the first power plant. The first accessory gearbox 20 also has an outlet shaft 23 mechanically connected to the first mechanical connection interface 8.

Similarly, in order to make it possible to reduce the speed of rotation of the outlet shafts 43' and 44' of the second power plant 13, the aircraft 1 may then also have a second accessory gearbox 24 provided with two inlet shafts 21 and 22. These inlet shafts 21 and 22 are connected mechanically to respective ones of the two outlet shafts 43' and 44' of the two motors 41' and 42' of the electric type of the second power plant. The second accessory gearbox 24 also has an outlet shaft 27 mechanically connected to the second mechanical connection interface 9.

Figure 7:
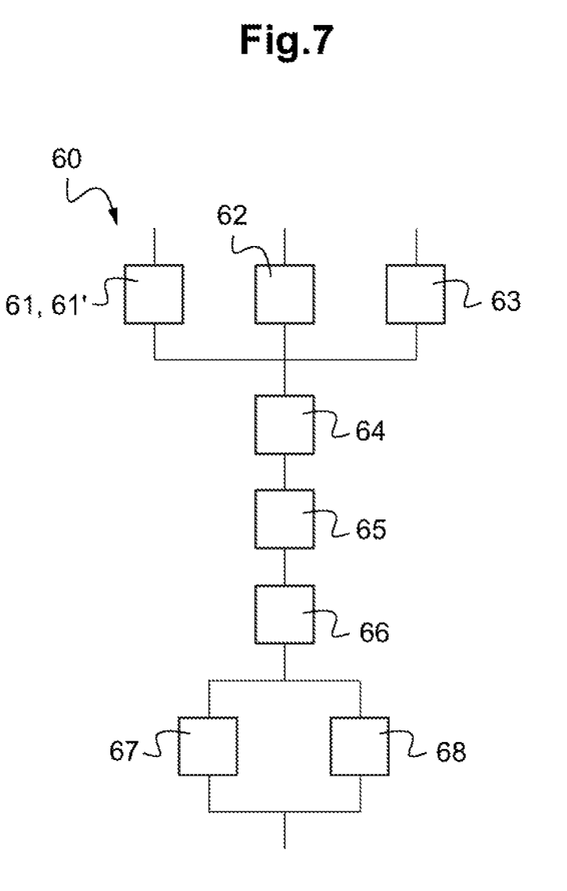
FIG. 7 is a flow chart showing a first implementation of a method of preparing a modular-type aircraft of the invention.

As shown in FIG. 7, the invention also relates to a method 60 of preparing an aircraft 1 of the above-described modular type for a specific mission.

Thus, a first implementation of such a preparation method then includes a first determination step 61, 61' for determining (61) the needs in terms of range and/or for determining (61') the needs in terms of performance of the aircraft 1 for flying the mission, a second determination step 62 for determining constraints related to a safety level for the mission, and a third determination step 63 for determining the constraints related to a maximum noise level allowable for the mission.

As shown, these three determination steps 61, 61', 62, and 63 may be performed simultaneously in parallel, but they may also be implemented in succession one after another without any predefined order.

Furthermore, in other examples (not shown), only one of these three determination steps 61, 61', 62, and 63 may be implemented independently, or other preliminary determination steps (not shown) may also be implemented by such a method 60. For example, the method 60 may also include a determination step for determining a minimum number of people to be transported by the aircraft 1 or indeed a determination step for determining a maximum payload of goods that the aircraft 1 can transport.

The method 60 then includes a generation step 64 making it possible to generate a list of at least two power plants as a function of the needs and constraints in terms of range or related to the safety level for the mission, and then a selection step 65 for selecting the power plant(s) 3, 13 of the combustion engine type or of the electric motor type from among the list of the at least two power plants of the combustion engine type and/or of the electric motor type. Such a list may be produced from a catalog supplied by the manufacturer of the aircraft, or more simply from power plants actually available and present in a place of storage of a fleet of aircraft and of power plants belonging to an operator.

For example, such a catalog or such a list of available power plants may include at least one of the following power plants:
 a motor of the electric type;
 an engine of the combustion type;
 two motors of the electric type; and
 two engines of the combustion type.

Naturally, such an aircraft may then be equipped with more than two motors or engines of each of the above-described types Furthermore, each of the power plants may also come in one or more power plant versions, each power plant version being associated, for example, with a specific developed power level.

Such a selection step 65 is thus specific to the mission of the aircraft 1. Finally, the method 60 includes a fitting step 66 for fitting the selected power plant(s) 3, 13 to the structure 10 of the aircraft 1.

The method 60 then also includes an electrical connection step 67 for electrically connecting each selected power plant 3, 13 to the avionics system 5 for assisting in piloting the aircraft 1, and a mechanical connection step 68 for mechanically connecting each selected power plant 3, 13 to the main gearbox 4.

As shown, these two connection steps 67, 68 may be performed simultaneously in parallel or indeed successively one after the other without any predefined order.

Figure 8:
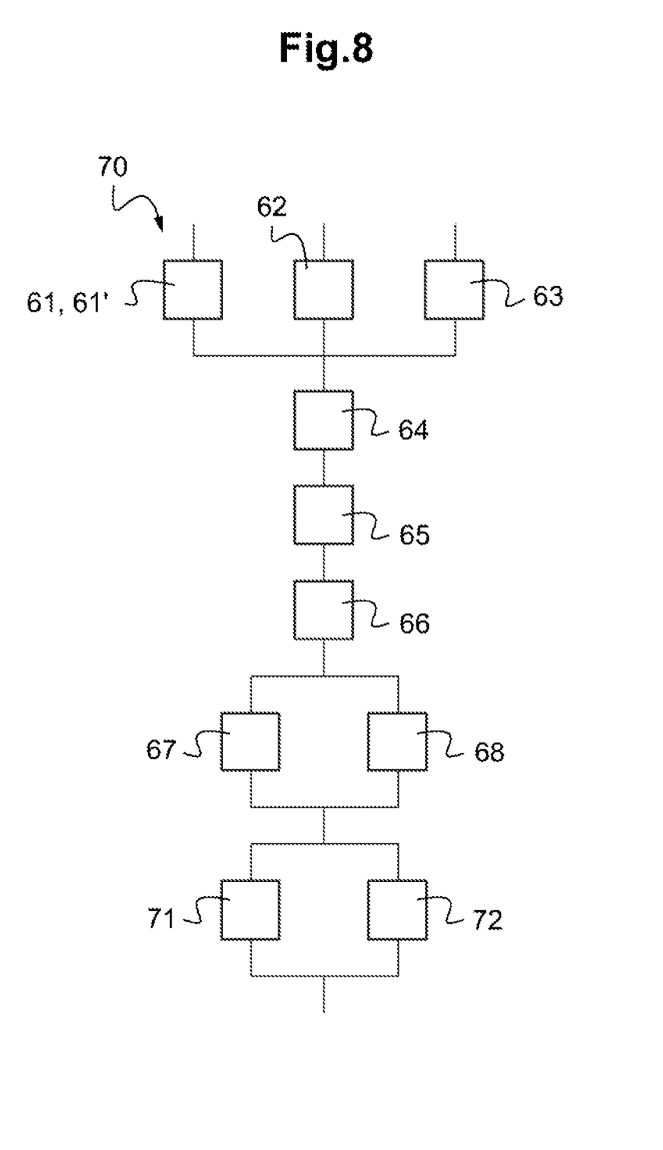
FIG. 8 is a flow chart showing a second implementation of a method of preparing a modular-type aircraft of the invention.

As shown in FIG. 8, a second implementation of the method 70 may, in addition to the various steps of the method. 60, further include additional steps, and in particular a securing step making it possible to secure a storage compartment 51 for storing a fuel or electrical energy source to the structure 10 of the aircraft 1. Such a storage compartment 51 may then be mounted on the structure 10 to replace a storage compartment 50 initially arranged on the aircraft.

Furthermore, such a storage compartment 51 makes it possible to store a fuel or electrical energy source adapted to the selected power plant(s) 3, 13.

In which case, the method 70 then also includes a hydraulic or electrical connection step 72 making it possible to connect the storage compartment 51 to the selected power plant(s) 3, 13.

As shown, these two steps, namely the securing step 71 and the hydraulic or electrical connection step 72 may be performed simultaneously in parallel or indeed successively one after the other without any predefined order.

Naturally, the present invention can be the subject of numerous variants as to its implementation. Although several embodiments and implementations are described, it should readily be understood that it is not conceivable to identify exhaustively all possible embodiments and implementations. It is naturally possible to envisage replacing any of the means described by equivalent means without going beyond the ambit of the present invention.

What is claimed is:

1. An aircraft of a modular type including:
    at least one rotor suitable for providing in full or in part propulsion and/or lift for the aircraft;
    at least one power plant of the combustion engine type or of the electric motor type;
    a main gearbox, for mechanically transmitting drive torque generated by the at least one power plant to the at least one rotor; and
    an avionics system for assisting in piloting the aircraft;
    wherein the aircraft further includes:
    at least two electrical connection interfaces that are continuously electrically connected to the avionics system, a first electrical connection interface electrically connecting the avionics system to a first power plant of the at least one power plant and a second electrical connection interface being left free or electrically connecting the avionics system to a second power plant of the at least one power plant; and
    at least two mechanical connection interfaces continuously mechanically connected to the main gearbox, a first mechanical connection interface mechanically connecting the main gearbox to the first power plant and a second mechanical connection interface being left free or mechanically connecting the main gearbox to the second power plant; and
    wherein the avionics system is configured for automatically providing the assistance in piloting the aircraft firstly when only the first power plant is electrically connected to the first electrical connection interface and secondly when both the first power plant is electrically connected to the first electrical connection interface and the second power plant is electrically connected to the second electrical connection interface; and
    wherein the first power plant is arranged in such a manner as to be retractable relative to a structure of the aircraft and replaceable with another power plant of the combustion engine type or of the electric motor type that is distinct from the first power plant.

2. The aircraft according to claim 1, wherein the second power plant is arranged in such a manner as to be retractable relative to a structure of the aircraft and replaceable with another power plant of the combustion engine type or of the electric motor type that is distinct from the second power plant.

3. The aircraft according to claim 1, wherein the first power plant includes a first group of at least two engines of the combustion type or a first group of at least two motors of the electric type.

4. The aircraft according to claim 3, wherein the aircraft includes a first accessory gearbox, the first accessory gearbox comprising at least two inlet shafts mechanically connected to respective ones of the outlets shafts of the at least two motors or engines of the first group, the first accessory gearbox comprising an outlet shaft mechanically connected to the first mechanical connection interface.

5. The aircraft according to claim 4, wherein the first accessory gearbox comprises a speed reducer for adapting and reducing a speed of rotation of the outlet shafts of the at least two motors of the electric type of the first group.

6. The aircraft according to claim 1, wherein the second power plant includes a second group of at least two engines of the combustion type or a second group of at least two motors of the electric type.

7. The aircraft according to claim 6, wherein the aircraft includes a second accessory gearbox, the second accessory gearbox comprising at least two inlet shafts mechanically connected to respective ones of the outlets shafts of the at least two motors or engines of the second group, the second accessory gearbox comprising an outlet shaft mechanically connected to the second mechanical connection interface.

8. The aircraft according to claim 7, wherein the second accessory gearbox comprises a speed reducer for adapting and reducing a speed of rotation of the outlet shafts of the at least two motors of the electric type of the second group.

9. The aircraft according to claim 1, wherein the aircraft includes a first storage compartment to store a fuel energy first energy source, the first storage compartment being hydraulically connected to the at least one power plant for the purpose of feeding the at least one power plant with the fuel energy first energy source, the first storage compartment being fully or partially retractable relative to a structure of the aircraft and replaceable with a second storage compartment for storing an electrical energy second energy source distinct from the fuel energy first energy source.

10. The aircraft according to claim 1, wherein the aircraft includes a first storage compartment to store an electrical energy first energy source, the first storage compartment being electrically connected to the at least one power plant for the purpose of powering the at least one power plant with the electrical energy first energy source, the first storage compartment being fully or partially retractable relative to a structure of the aircraft and replaceable with a second storage compartment for storing a fuel energy second energy source distinct from the electrical energy first energy source.

11. A method of preparing the aircraft of a modular type according to claim 1 for a specific mission, wherein the method comprises firstly at least one preliminary step chosen from among the group comprising the following preliminary steps:
    determining the needs in terms of range of the aircraft for flying the mission;
    determining the needs in terms of performance of the aircraft for flying the mission;
    determining the constraints related to a safety level for the mission; and
    determining the constraints related to a maximum noise level allowable for the mission; and secondly the following steps:
generating a list of at least two power plants of the combustion engine type and/or of the electric motor type, the list being conditioned by the at least one preliminary step, and being adapted specifically to the mission of the aircraft;
selecting the at least one power plant of the combustion engine type or of the electric motor type from among the list of at least two power plants of the combustion engine type and/or of the electric motor type; and
fitting the at least one power plant that is selected to the structure of the aircraft;
electrically connecting the at least one power plant that is selected to the avionics system for assisting in piloting the aircraft; and
mechanically connecting the at least one power plant that is selected to the main gearbox.

12. The method according to claim 11, wherein the method further comprises a securing step for securing to the structure of the aircraft a storage compartment for storing a fuel or electrical energy source adapted to the at least one power plant that is selected, and a hydraulic or electrical connection step for connecting the storage compartment to the at least one power plant that is selected.

13. An aircraft of a modular type including:
a rotor suitable for providing propulsion and/or lift for the aircraft;
at least one power plant;
a main gearbox for mechanically transmitting drive torque generated by the at least one power plant to the rotor; and
an avionics system for assisting in piloting the aircraft;
a first and a second electrical connection interface that are continuously electrically connected to the avionics system, the first electrical connection interface electrically connecting the avionics system to a first power plant of the at least one power plant and the second electrical connection interface selectively left free or electrically connecting the avionics system to a second power plant of the at least one power plant; and
a first and a second mechanical connection interface continuously mechanically connected to the main gearbox, the first mechanical connection interface mechanically connecting the main gearbox to the first power plant and the second mechanical connection interface selectively left free or mechanically connecting the main gearbox to the second power plant; and
wherein the avionics system is configured for automatically providing the assistance in piloting the aircraft firstly when only the first power plant is electrically connected to the first electrical connection interface and secondly when both the first power plant is electrically connected to the first electrical connection interface and the second power plant is electrically connected to the second electrical connection interface;
wherein the first power plant is arranged in such a manner as to be retractable relative to a structure of the aircraft and replaceable with another power plant of the combustion engine type or of the electric motor type that is distinct from the first power plant.

14. The aircraft according to claim 13, wherein the first power plant is arranged in such a manner as to be retractable relative to a structure of the aircraft and to enable the first power plant to be replaced with another power plant of the combustion engine type or of the electric motor type that is a different type from the first power plant.

15. The aircraft according to claim 13, wherein the second power plant is arranged in such a manner as to be retractable relative to a structure of the aircraft and to enable the second power plant to be replaced with another power plant of the combustion engine type or of the electric motor type that is a different type from the second power plant.

16. The aircraft according to claim 13, wherein the aircraft includes a first storage compartment to store a fuel energy first energy source, the first storage compartment being hydraulically connected to the at least one power plant for the purpose of feeding the at least one power plant with the fuel energy first energy source, the first storage compartment being fully or partially retractable relative to a structure of the aircraft and to enable the first storage compartment to be replaced with a second storage compartment for storing an electrical energy second energy source distinct from the fuel energy first energy source.

17. The aircraft according to claim 13, wherein the aircraft includes a first storage compartment to store an electrical energy first energy source, the first storage compartment being electrically connected to the at least one power plant for the purpose of powering the at least one power plant with the electrical energy first energy source, the first storage compartment being fully or partially retractable relative to a structure of the aircraft and to enable the first storage compartment to be replaced with a second storage compartment for storing a fuel energy second energy source distinct from the electrical energy first energy source.

18. The aircraft according to claim 1, wherein the main gearbox is connected directly to the at least one power plant and the at least one rotor.

19. The aircraft according to claim 1, wherein the main gearbox is connected directly between the at least one power plant and the at least one rotor.

* * * * *